(12) United States Patent
Morgan et al.

(10) Patent No.: US 10,996,354 B2
(45) Date of Patent: May 4, 2021

(54) ELECTRONICALLY COLLIMATED GAMMA RADIATION DETECTOR

(71) Applicant: United States of America as Represented by The Secretary of The Army, Alexandria, VA (US)

(72) Inventors: John C. Morgan, Vicksburg, MS (US); John Furey, Vicksburg, MS (US); Austin V. Davis, Clinton, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 25 days.

(21) Appl. No.: 15/280,530

(22) Filed: Sep. 29, 2016

(65) Prior Publication Data

US 2018/0088246 A1    Mar. 29, 2018

(51) Int. Cl.
*G01T 7/00* (2006.01)
*G01V 5/00* (2006.01)

(52) U.S. Cl.
CPC .............. *G01T 7/00* (2013.01); *G01V 5/0008* (2013.01)

(58) Field of Classification Search
CPC .............. G01T 1/17; G01T 1/169; G21K 1/00
See application file for complete search history.

(56) References Cited

U.S. PATENT DOCUMENTS

| | | | | |
|---|---|---|---|---|
| 6,909,105 | B1* | 6/2005 | Heintzmann | G02B 21/00 250/550 |
| 7,791,029 | B2* | 9/2010 | Michaud | G01T 1/2985 250/363.03 |
| 2006/0284094 | A1* | 12/2006 | Inbar | G01V 5/0075 250/359.1 |

* cited by examiner

*Primary Examiner* — Manuel L Barbee
(74) *Attorney, Agent, or Firm* — Brian C. Jones

(57) ABSTRACT

The present invention is an electronically collimated gamma radiation detector apparatus including a radiation sensor coupled to a digitizer, which is coupled to a processor. The apparatus receives an analog signal waveform from the sensor and transmits it to the digitizer, for transformation to a digital pulse waveform. This waveform is transmitted to the processor, which calculates at least one pulse shape parameter of the waveform, instantiates a pulse data object, and populates the object with a pulse identifier, a vector parameter, and the pulse shape parameter. The above steps are repeated at a different vector to obtain multiple objects. The processor compares pulse shape parameters from different objects using a comparison method. The comparison method updates each object with a longitudinal, transverse, or angled directional parameter. The processor can output vector parameters associated longitudinal parameters, output objects with a desired vector parameter, or conduct further analysis on objects.

17 Claims, 5 Drawing Sheets

ELECTRONICALLY COLLIMATED GAMMA RADIATION DETECTOR

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of radiation measurement instruments and more specifically to an electronic collimator for detecting gamma radiation.

BACKGROUND OF THE INVENTION

Gamma radiation is a type of biologically hazardous radiation emitted by radioactive materials, such as the uranium in nuclear reactors and weapons-grade plutonium. Detection of gamma radiation is therefore of highest importance to military personnel searching for nuclear weapons or radioactive waste that might be present in a dirty bomb. Changes in background gamma radiation can indicate movement of nuclear weapons through an area, allowing investigators to determine the travel path of such weapons. Gamma radiation detection is also useful when prospecting for radioactive ores or cleaning radioactive waste.

Traditionally, gamma radiation detectors had a large volume, to allow them to better interact with gamma radiation. Thick layers of metallic shielding, such as a heavy coating of lead, allowed a gamma radiation detector to physical collimate the gamma radiation and determine the direction of gamma radiation emission. As a result, most gamma radiation detectors known in the art are so large and heavy that they cannot be easily used in the field.

One attempted solution reduced the gamma radiation detectors' overall size. Unfortunately, smaller gamma radiation detectors required the same thicknesses of heavy shielding for collimation. Smaller detectors also had a reduced volume, less able to interact with the gamma radiation when shielded. While smaller, unshielded detectors could determine the presence of radiation, they were not able to effectively determine directionality. Another solution utilized arrays of smaller gamma detectors. However, this required large amounts of computing power and was not efficient for field use, where a single sensor may be all that is available.

There is an unmet need in the art for a gamma radiation detector capable of directional detection without the use of shielding.

BRIEF SUMMARY OF THE INVENTION

One embodiment of the present invention is a computer storage medium that stores at least one pulse data object. The pulse data object includes a pulse identifier, a vector parameter, and at least one pulse shape parameter.

Another embodiment of the present invention is an electronically collimated gamma radiation detector apparatus used to create the pulse data object as above. The apparatus includes a radiation sensor coupled to a digitizer, which is in turn coupled to a processor. The apparatus receives an analog signal waveform from the radiation sensor and transmits it to the digitizer, which digitizes it to a digital pulse waveform. The waveform is transmitted to the processor, which calculates at least one pulse shape parameter of the waveform, instantiates a pulse data object, and populates the pulse data object with a pulse identifier, a vector parameter, and the pulse shape parameter. The above steps are repeated at a different vector to obtain multiple pulse data objects. The processor compares pulse shape parameters from different pulse data objects using a comparison method. The comparison method updates each pulse data object with a longitudinal, transverse, or angled directional parameter. The processor can then output the vector parameter of any pulse data objects having a directional parameter of longitudinal.

Another embodiment of the present invention is gamma radiation detector system made up of multiple electronically collimated gamma radiation detector apparatuses, as above.

BRIEF DESCRIPTION OF SEVERAL VIEWS OF THE DRAWING(S)

TERMS OF ART

As used herein, the term "gamma radiation" refers to radiation having a wavelength equal to or below approximately 10 picometers and a frequency equal to or above approximately 10 exahertz.

As used herein, the term "vector" refers to a quantity identifying direction or orientation relative to a point.

DETAILED DESCRIPTION OF THE INVENTION

Figure 1:
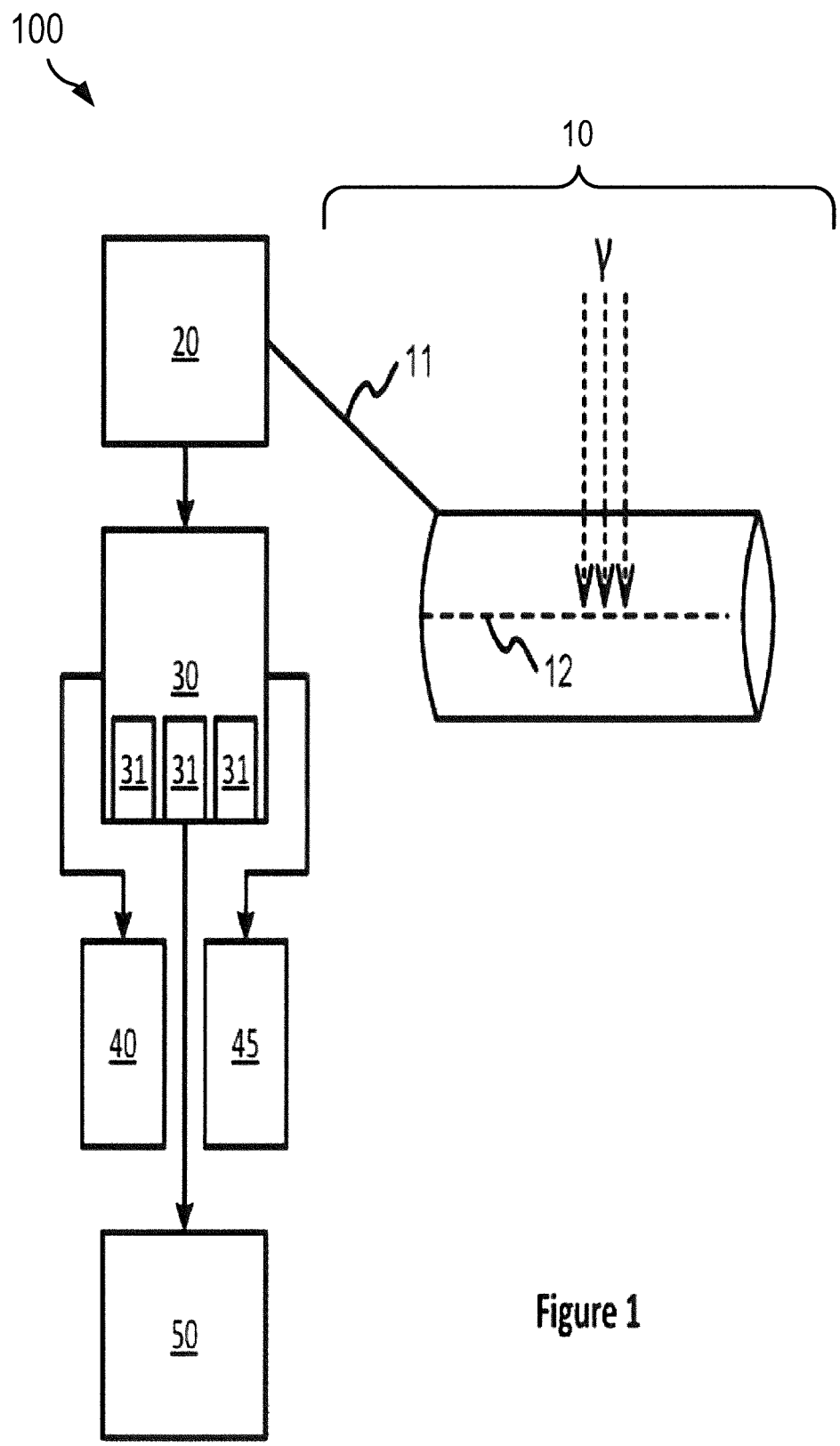
FIG. 1 illustrates an exemplary embodiment of an electronically collimated gamma radiation detector.

FIG. 1 illustrates an exemplary embodiment of gamma radiation detector 100. Gamma radiation detector 100 includes at least one radiation sensor 10 connected to a digitizer 20 and a processor 30. Processor 30 may optionally be connected to a computer storage medium 40 or a transmitter 45 to store or transmit data, or to a user interface 50 to display data.

Radiation sensor 10 is a sensor capable of detecting gamma radiation. In the exemplary embodiment, radiation sensor 10 is a cylindrical gas proportional detector with a waveform output 11 and an axial electrode 12. In other embodiments, radiation sensor 10 may include other non-spherical gas proportional detectors, cylindrical solid state detectors, or cylindrical scintillators with axial photodetectors. In the exemplary embodiment, radiation sensor 10 is intended to be used in the field by a single user, and has a diameter ranging from approximately 2 cm to approximately 5 cm, with a length ranging from approximately 7 cm to approximately 12 cm. Other embodiments may use larger radiation sensors for vehicle-mounted or non-moveable applications.

In certain embodiments, gamma radiation detector 100 includes multiple radiation sensors 10 connected to digitizer 20 and processor 30. These radiation sensors 10 may be oriented at angles to each other to enable faster determination of the direction of a gamma radiation source.

Waveform output 11 is connected to digitizer 20 to allow data transmission of an analog signal waveform from radiation sensor 10. Axial electrode 12 extends along the longitudinal axis of radiation sensor 10 to interact with gamma radiation and create the analog signal waveform.

In the exemplary embodiment, digitizer 20 requires a sampling rate of at least 500 kHz. Embodiments with a smaller radiation sensor 10 will require a proportionally higher sampling rate. Digitizer 20 digitizes the analog signal waveform to a digital pulse waveform, which is transmitted to processor 30 for analysis.

Processor 30 is at least a 16-bit processor with a processing speed greater than that of digitizer 20. Processor 30 may include, but is not limited to a microprocessor, a field-programmable gate array or an application-specific integrated circuit. In certain embodiments, digitizer 20 and processor 30 may be combined into a single device, such as a microprocessor, to reduce the overall size of gamma radiation detector 100.

Processor 30 determines pulse shape parameters of the digital pulse waveform, such as, but not limited to pulse width, pulse height, pulse area, pulse rise time, and pulse decay time. Processor 30 also performs various analyses on the digital pulse waveform to determine the source and direction of gamma radiation. Processor 30 instantiates a pulse data object 31 and populates it with data including a pulse identifier, vector parameter, and the pulse shape parameter or parameters. In certain embodiments, processor 30 also populates pulse data object 31 with position and/or time parameters.

In the exemplary embodiment, gamma radiation detector 100 also includes computer storage medium 40 and transmitter 45 coupled to processor 30 to store or transmit data, respectively. Data so stored or transmitted may include the analog signal waveform, the digital pulse waveform, or pulse data object 31. Data computer storage medium 40 may be a non-volatile computer storage medium, random-access memory, hard disk drives, or optical discs. Other embodiments may use a user interface 50 to display data to a user immediately or after analysis using a text-based or graphical user interface.

In the exemplary embodiment, gamma radiation detector 100 is sized to be portable and useable by a single user. Other embodiments may utilize a larger gamma radiation detector 100 permanently mounted in place at a particular location or on a vehicle.

Figure 2:
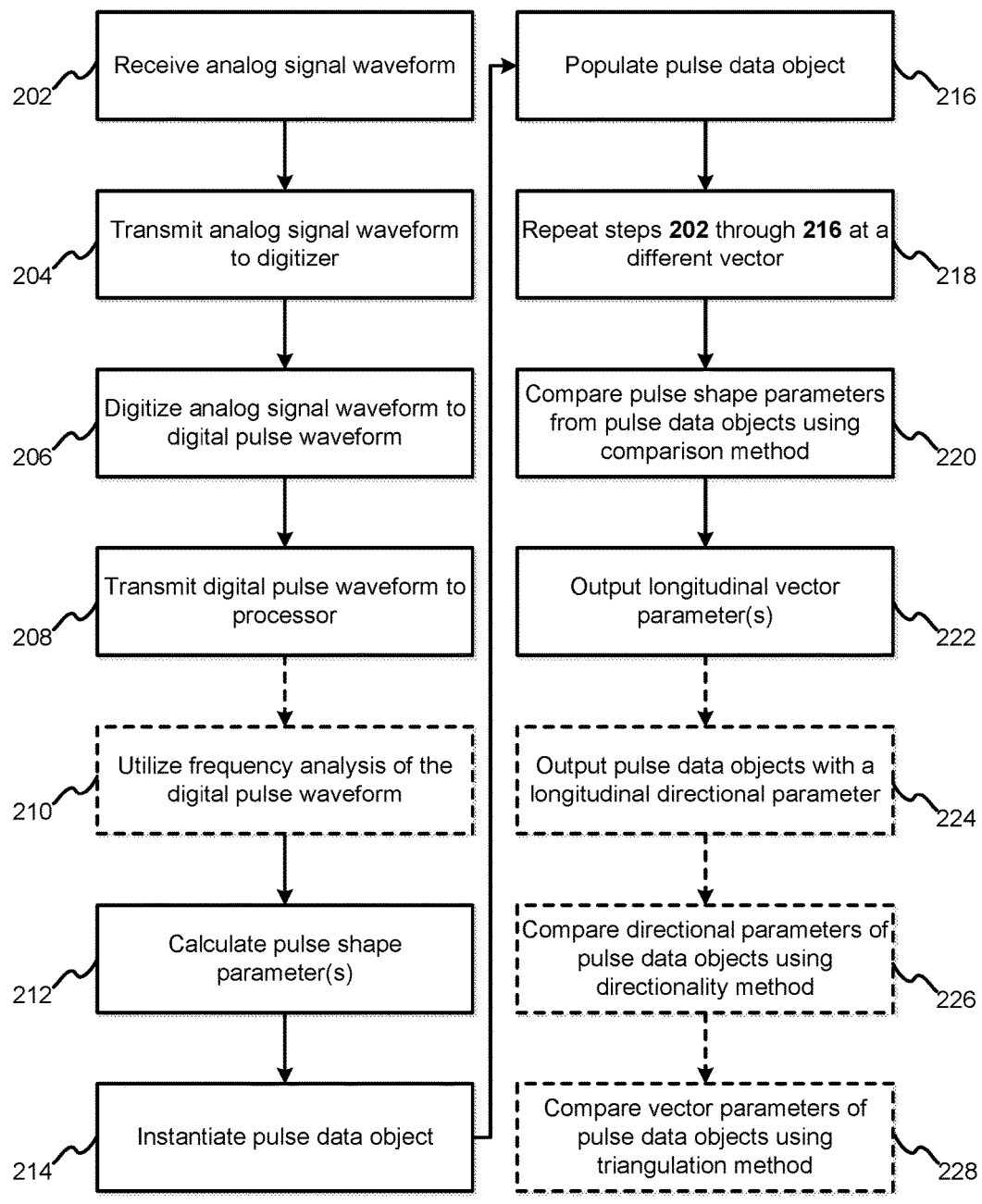
FIG. 2 illustrates a flowchart of an exemplary embodiment of a method for electronically collimating a gamma radiation detector.

FIG. 2 illustrates a flowchart of an exemplary embodiment of method 200 for electronically collimating gamma radiation detector 100.

In step 202, method 200 receives the analog signal waveform produced by the collision of gamma radiation with radiation sensor 10, when radiation sensor 10 is oriented in a particular direction.

In step 204, method 200 transmits the analog signal waveform to digitizer 20.

In step 206, method 200 digitizes the analog signal waveform to a digital pulse waveform using digitizer 20.

In step 208, method 200 transmits the digital pulse waveform to processor 30.

In optional step 210, method 200 utilizes frequency analysis of the digital pulse waveform to determine if the original analog signal waveform was produced by gamma radiation from multiple gamma radiation sources.

In step 212, method 200 calculates at least one pulse shape parameter of the digital pulse waveform using processor 30. The pulse shape parameters can include pulse width, pulse height, pulse area, pulse rise time, and pulse decay time.

In step 214, method 200 instantiates at least a first pulse data object 31.

In step 216, method 200 populates pulse data object 31 with a pulse identifier, vector parameter, and the pulse shape parameter or parameters. In certain embodiments, processor 30 also populates pulse data object 31 with position parameters. Vector and position parameters may be automatically generated or input by a user.

In step 218, method 200 repeats steps 202 through 216 at a different vector to obtain a second pulse data object 31.

In step 220, method 200 compares the pulse shape parameters from the first pulse data object 31 with pulse shape parameters from the second pulse data object 31 using comparison method 300. Comparison method 300 updates each pulse data object 31 with a directional parameter of "longitudinal," "transverse," or "angled." Pulse data objects 31 with a directional parameter of "longitudinal" are those which resulted from a longitudinal collision of gamma radiation with radiation sensor 10. These pulse data objects 31 are identical to those produced through prior art shielding and collimation. Pulse data objects 31 with a directional parameter of "transverse" are those which resulted from a transverse collision of gamma radiation with radiation sensor 10. Pulse data objects 31 with a directional parameter of "angled" are those which resulted from an angled collision of gamma radiation with radiation sensor 10.

In step 222, method 200 outputs the vector parameter or parameters of the pulse data object or structures 31 having a directional parameter of "longitudinal."

In optional step 224, method 200 outputs any pulse data objects 31 that have a directional parameter of "longitudinal." These pulse data objects 31 may be used in standard nuclear spectroscopy programs which require data produced by a longitudinal collision of gamma radiation with radiation sensor 10.

In optional step 226, method 200 compares directional parameters of the pulse data objects 31 using directionality method 400 to guide a user in the direction of the gamma radiation sources.

In optional step 228, method 200 compares vector parameters of pulse data objects 31 obtained from geographically dispersed gamma radiation detectors 100 using triangulation method 500.

Figure 3:
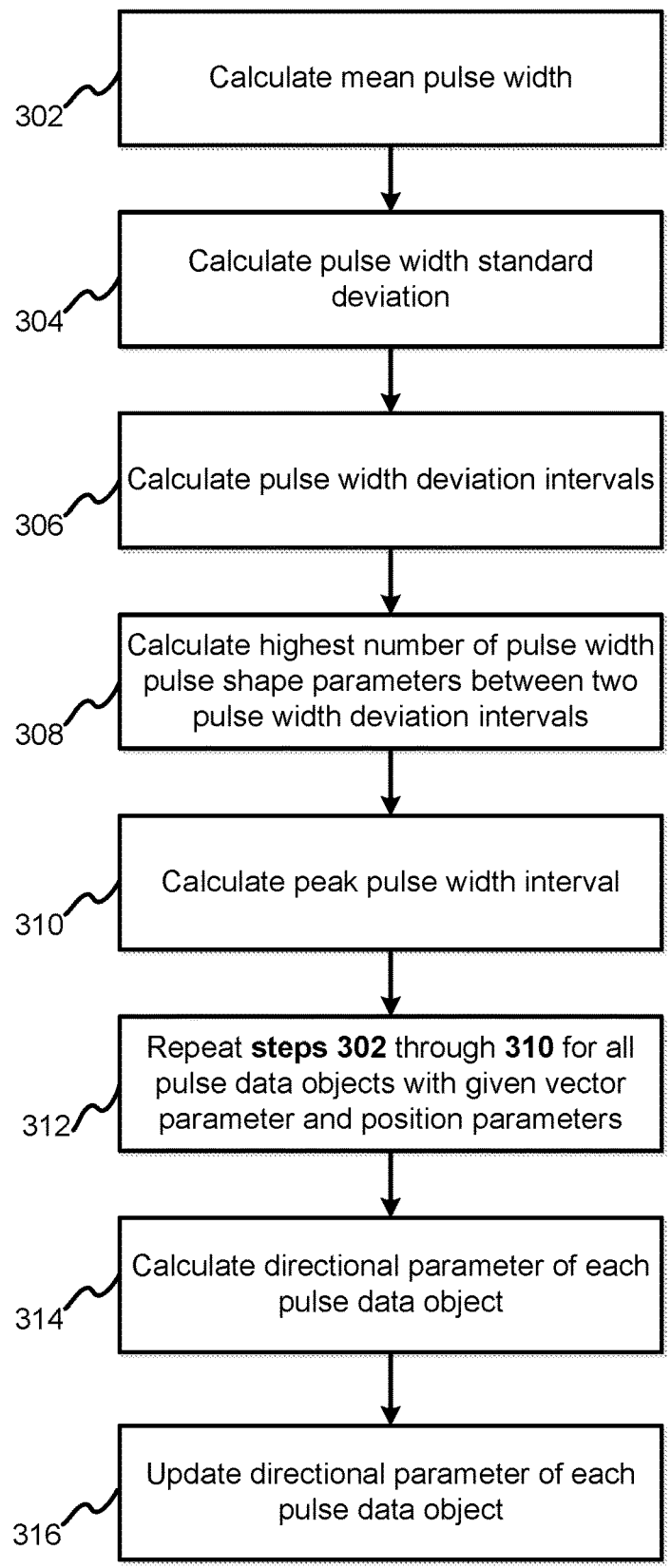
FIG. 3 illustrates a flowchart of an exemplary embodiment of a comparison method for use with a gamma radiation detector.

FIG. 3 illustrates a flowchart of an exemplary embodiment of comparison method 300 for use with gamma radiation detector 100.

In step 302, method 300 calculates a mean pulse width $M_w$ from all pulse width pulse shape parameters $P_{wj}$ of pulse data objects 31 with the vector parameter $VP_n$ and the position parameter PP, where j is the number of pulse data objects 31 and n is the number of different vectors at which pulse data objects 31 were obtained at position parameter PP. The position parameter PP is identical for all steps for method 300.

In step 304, method 300 calculates pulse width standard deviation $\sigma_w$ for all pulse width pulse shape parameters $P_{wj}$ of all pulse data objects 31.

In step 306, method 300 calculates a plurality of pulse width deviation intervals $\sigma_{wi}$, using the equation:

$$\sigma_{wi}=(i*\sigma_w)+M_w$$

In the exemplary embodiment, i is a user-input variable for the number of pulse width deviation intervals $\sigma_{wi}$. In other embodiments, i is a predetermined number of pulse width deviation intervals $\sigma_{wi}$.

In step 308, method 300 calculates the highest number of pulse width pulse shape parameters $P_{wj}$ that fall between two pulse width deviation intervals $\sigma_{wi}$ and $\sigma_{wi+1}$.

In step 310, method 300 calculates a peak pulse width interval $PW_n$ by averaging $\sigma_{wi}$ and $\sigma_{wi+1}$.

In step 312, method 300 iteratively repeats steps 302 through 310 for all pulse data objects 31 with the vector parameter $VP_n$ and the position parameter PP. Vector parameter $VP_n$ varies by at least 180 degrees throughout the iterations for steps 302 through 310.

In step 314, method 300 calculates the directional parameter of each pulse data object 31 by ranking each peak pulse width interval $PW_n$ from largest to smallest. The largest peak pulse width interval $PW_n$ indicates transverse vector to the gamma source. The smallest peak pulse width interval $PW_n$ indicates longitudinal vector to the gamma source. Peak pulse width intervals $PW_n$ between the largest and smallest values indicate angled vector to the gamma source.

In step 314, method 300 updates the directional parameter of each pulse data object 31 as "longitudinal," "transverse," or "angled."

Figure 4:
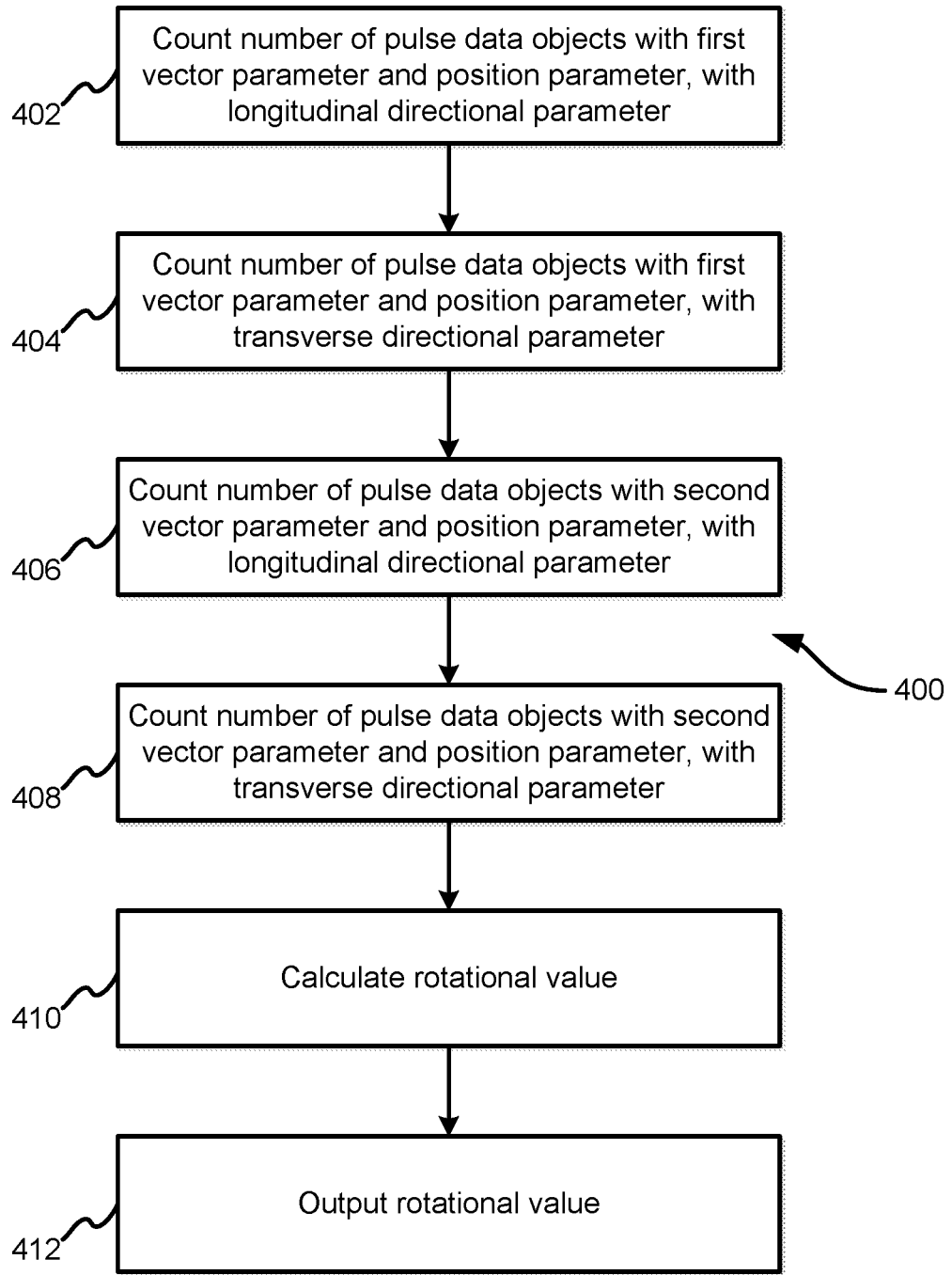
FIG. 4 illustrates a flowchart of an exemplary embodiment of a directionality method for use with a gamma radiation detector.

FIG. 4 illustrates a flowchart of an exemplary embodiment of a directionality method 400 for use with gamma radiation detector 100.

In step 402, method 400 counts the number $N_{L1}$ of pulse data objects 31 with a first vector parameter $VP_1$ and a position parameter PP, having a directional parameter of "longitudinal."

In step 404, method 400 counts the number $N_{T1}$ of pulse data objects 31 with the first vector parameter $VP_1$ and the position parameter PP, having a directional parameter of "transverse."

In step 406, method 400 counts the number $N_{L2}$ of pulse data objects 31 with a second vector parameter $VP_2$ and the position parameter PP, having a directional parameter of "longitudinal."

In step 408, method 400 counts the number $N_{T2}$ of pulse data objects 31 with the second vector parameter $VP_2$ and the position parameter PP, having a directional parameter of "transverse." The position parameter PP is identical in steps 402 through 408, while the first vector parameter $VP_1$ differs from the second vector parameter $VP_2$ by less than 180 degrees.

In step 410, method 400 calculates a rotational value $V_r$ using the equation:

$$V_r = \frac{1-\left(\frac{N_{L2}}{N_{L2}+N_{T2}}\right)}{\left(\frac{\left(\frac{N_{L1}}{N_{L1}+N_{T1}}\right)-\left(\frac{N_{L2}}{N_{L2}+N_{T2}}\right)}{VP_1-VP_2}\right)}$$

where rotational value $V_r$ is the amount of rotation from second vector parameter $VP_2$ required to align radiation sensor 10 with the gamma radiation source.

In step 412, method 400 outputs rotational value $V_r$.

Figure 5:
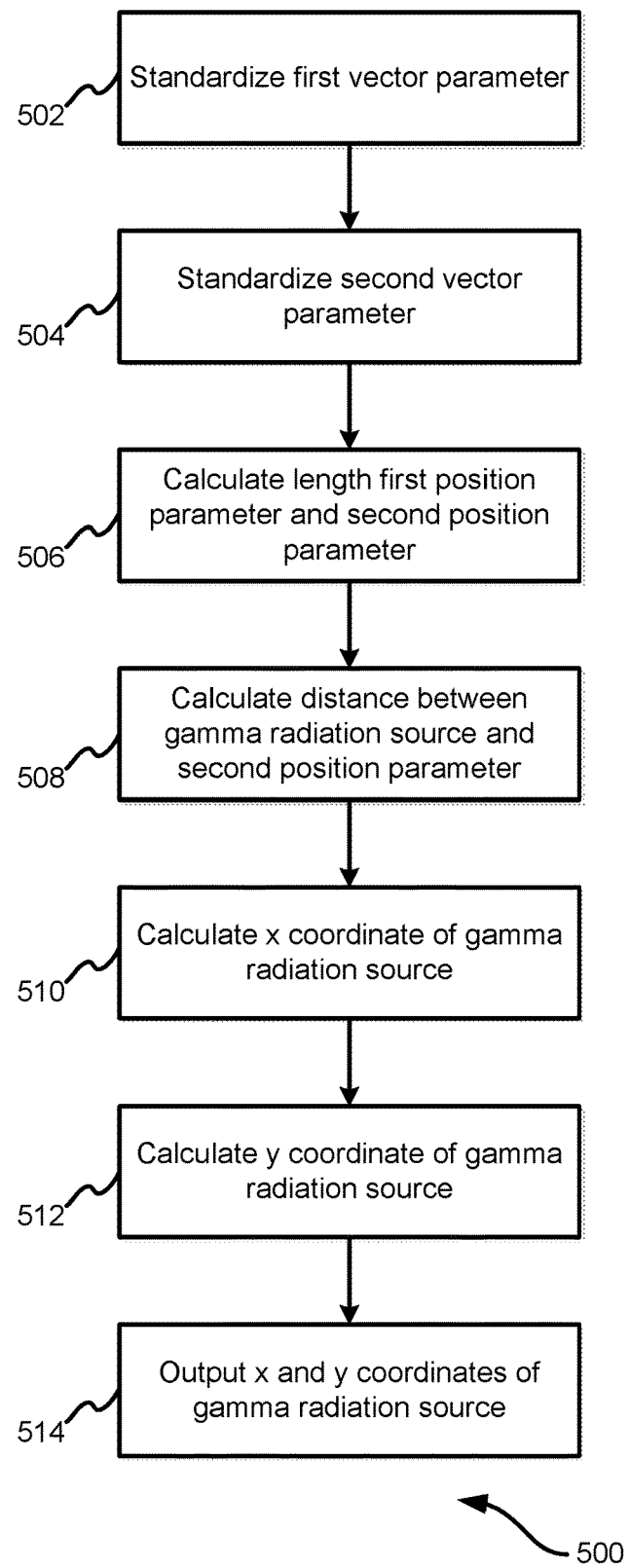
FIG. 5 illustrates a flowchart of an exemplary embodiment of a triangulation method for use with a gamma radiation detector.

FIG. 5 illustrates a flowchart of an exemplary embodiment of a triangulation method 500 for use with multiple gamma radiation detectors 100.

In step 502, method 500 standardizes a first vector parameter $VP_1$ by subtracting 90 degrees from it if first vector parameter $VP_1$ is greater than or equal to 90 degrees and less than 180 degrees, subtracting 180 degrees from it if first vector parameter $VP_1$ is greater than or equal to 180 degrees and less than 270 degrees, or subtracting 270 degrees from it if first vector parameter $VP_1$ is greater than or equal to 270 degrees and less than 360 degrees.

In step 504, method 500 standardizes a second vector parameter $VP_2$ by subtracting 90 degrees from it if second vector parameter $VP_2$ is greater than 90 degrees and less than or equal to 180 degrees, subtracting 180 degrees from it if second vector parameter $VP_2$ is greater than 180 degrees and less than or equal to 270 degrees, or subtracting 270 degrees from it if second vector parameter $VP_2$ is greater than 270 degrees and less than or equal to 360 degrees.

In step 506, method 500 calculates a length L between the first position parameter $PP_1$ and the second position parameter $PP_2$ using the equation:

$$L=\sqrt{(PP_{1x}-PP_{2x})^2+(PP_{2y}-PP_{1y})^2}$$

where $PP_{1x}$ is the x coordinate of the first position parameter $PP_1$, $PP_{2x}$ is the x coordinate of the second position parameter $PP_2$, $PP_{1y}$ is the y coordinate of the first position parameter $PP_1$, and $PP_{2y}$ is the y coordinate of the second position parameter $PP_2$.

In step 508, method 500 calculates a distance D between the gamma radiation source and the second position parameter $PP_2$ using the equation:

$$D = \frac{L*\sin(VP_1)}{\sin(180-VP_1-VP_2)}$$

In step 510, method 500 calculates the x coordinate $GP_x$ of the gamma radiation source using the equation:

$$GP_x=PP_{2x}+(D*\cos(VP_2))$$

In step 512, method 500 calculates the y coordinate $GP_y$ of the gamma radiation source using the equation:

$$GP_y=PP_{2y}+(D*\sin(VP_2))$$

In step 514, method 500 outputs the x coordinate $GP_x$ and the y coordinate $GP_y$ of the gamma radiation source.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "about," "substantially" or "approximately" as used herein may be applied to modify any quantitative representation that could permissibly vary without resulting in a change in the basic function to which it is related.

What is claimed is:

1. An apparatus for electronically collimating gamma radiation, comprising:
   a radiation sensor operatively coupled to a digitizer; and
   a processor operatively coupled to said digitizer, said processor configured with software to perform a method for electronically collimating gamma radiation, said method comprising the steps of:
- (i) receiving an analog signal waveform from said radiation sensor,
- (ii) transmitting said analog signal waveform to said digitizer,
- (iii) digitizing said analog signal waveform to a digital pulse waveform,
- (iv) transmitting said digital pulse waveform to said processor,
- (v) calculating at least one pulse shape parameter of said digital pulse waveform,
- (vi) instantiating a pulse data object,
- (vii) populating said pulse data object with a pulse identifier, a vector parameter, and said at least one pulse shape parameter,
- (viii) repeating steps (i) through (vii) at a different vector to obtain a plurality of pulse data objects,
- (ix) comparing at least one pulse shape parameter from one of said plurality of pulse data objects with at least another pulse shape parameter from another of said plurality of pulse data objects using a comparison method to update each of said plurality of pulse data objects with a directional parameter selected from the group consisting of: longitudinal, transverse, and angled,
- (x) outputting said vector parameter of each of said plurality of pulse data objects having a directional parameter of longitudinal, and
- (xi) determining a direction of a source of the gamma radiation, relative to the radiation sensor, based on one or more outputted vector parameters.

2. The apparatus of claim 1, wherein said method further comprises the step of utilizing frequency analysis of said digital pulse waveform to determine if said analog signal waveform was produced by gamma radiation from multiple gamma radiation sources.

3. The apparatus of claim 1, wherein said method further comprises the step of populating each of said plurality of pulse data objects with a position parameter.

4. The apparatus of claim 1, wherein said method further comprises the step of outputting each of said plurality of pulse data objects having a directional parameter of longitudinal.

5. The apparatus of claim 4, wherein said comparison method comprises the steps of:
- (i) calculating a mean pulse width $M_w$ from pulse width pulse shape parameters $P_{wj}$ of said plurality of pulse data objects with a vector parameter $VP_n$ and a position parameter PP, where j is the number of said plurality of pulse data objects and n is the number of different vectors at which said plurality of pulse data objects were obtained at position parameter PP;
- (ii) calculating a pulse width standard deviation $\sigma_w$ for said pulse width pulse shape parameters $P_{wj}$ of said plurality of pulse data objects;
- (iii) calculating a plurality of pulse width deviation intervals $\sigma_{wi}$, using the equation:

$$\sigma_{wi} = (i*\sigma_w) + M_w$$

wherein i is a number of pulse width deviation intervals $\sigma_{wi}$;
- (iv) calculating a highest number of pulse width pulse shape parameters $P_{wj}$ that fall between two of said plurality of pulse width deviation intervals $\sigma_{wi}$ and $\sigma_{wi+1}$;
- (v) calculating a peak pulse width interval $PW_n$ by averaging $\sigma_{wi}$ and $\sigma_{wi+1}$;
- (vi) repeating steps (i) through (v) for said plurality of pulse data objects having a vector parameter $VP_n$ and a position parameter PP, wherein said vector parameter $VP_n$ varies by at least 180 degrees throughout steps (i) through (v);
- (vii) calculating a directional parameter of each of said plurality of pulse data objects by ranking each peak pulse width interval $PW_n$ from largest to smallest, wherein a largest peak pulse width interval $PW_n$ indicates transverse vector to the gamma source, a smallest peak pulse width interval $PW_n$ indicates longitudinal vector to the gamma source, and a peak pulse width intervals $PW_n$ between the largest and smallest values indicate angled vector to the gamma source; and
- (viii) updating a directional parameter of each of said plurality of pulse data object as longitudinal, transverse, or angled.

6. The apparatus of claim 1, wherein said method further comprises the step of comparing said directional parameters of said plurality of pulse data objects using a directionality method.

7. The apparatus of claim 6, wherein said directionality method further comprises the steps of:
- counting a number $N_{L1}$ of pulse data objects with a first vector parameter $VP_1$, a position parameter PP, and a directional parameter of longitudinal;
- counting a number $N_{T1}$ of pulse data objects with said first vector parameter $VP_1$, said position parameter PP, and a directional parameter of transverse;
- counting a number $N_{L2}$ of pulse data objects with a second vector parameter $VP_2$, said position parameter PP, and a directional parameter of longitudinal;
- counting a number $N_{T2}$ of pulse data objects with said second vector parameter $VP_2$, said position parameter PP, and a directional parameter of transverse, wherein said first vector parameter $VP_1$ differs from said second vector parameter $VP_2$ by less than 180 degrees;
- calculating a rotational value $V_r$ using the equation:

$$V_r = \frac{1 - \left(\frac{N_{L2}}{N_{L2} + N_{T2}}\right)}{\left(\frac{\left(\frac{N_{L1}}{N_{L1} + N_{T1}}\right) - \left(\frac{N_{L2}}{N_{L2} + N_{T2}}\right)}{VP_1 - VP_2}\right)}$$

wherein said rotational value $V_1$ is an amount of rotation from said second vector parameter $VP_2$ required to align said radiation sensor with a gamma radiation source; and
outputting said rotational value $V_r$.

8. The apparatus of claim 1, wherein said radiation sensor is selected from the group consisting of: non-spherical gas proportional detectors, cylindrical solid-state detectors, and cylindrical scintillators with axial photodetectors.

9. The apparatus of claim 1, wherein said digitizer has a sampling rate of at least 500 kHz.

10. The apparatus of claim 1, wherein said processor is at least a 16-bit processor, wherein said processor has a processing speed greater than that of said digitizer.

11. The apparatus of claim 1, wherein said digitizer and said processor are integrated into a single device.

12. The apparatus of claim 1, further comprising a computer storage medium operatively coupled to said processor, wherein said computer storage medium is configured with said at least one pulse data object, said at least one analog signal waveform, or said at least one digital pulse waveform.

13. The apparatus of claim 1, further comprising a transmitter operatively coupled to said processor.

14. The apparatus of claim 1, further comprising a user interface operatively coupled to said processor.

15. A gamma radiation detector system comprising:
a plurality of apparatuses for electronically collimating gamma radiation, each apparatus comprising:
  a radiation sensor operatively coupled to a digitizer; and
  a processor operatively coupled to said digitizer, said processor configured with software to perform a method for electronically collimating gamma radiation, said method comprising the steps of:
  (i) receiving an analog signal waveform from said radiation sensor,
  (ii) transmitting said analog signal waveform to said digitizer,
  (iii) digitizing said analog signal waveform to a digital pulse waveform,
  (iv) transmitting said digital pulse waveform to said processor,
  (v) calculating at least one pulse shape parameter of said digital pulse waveform,
  (vi) instantiating a pulse data object,
  (vii) populating said pulse data object with a pulse identifier, a vector parameter, and said at least one pulse shape parameter,
  (viii) repeating steps (i) through (vii) at a different vector to obtain a plurality of pulse data objects,
  (ix) comparing at least one pulse shape parameter from one of said plurality of pulse data objects with at least another pulse shape parameter from another of said plurality of pulse data objects using a comparison method to update each of said plurality of pulse data objects with a directional parameter selected from the group consisting of: longitudinal, transverse, and angled,
  (x) outputting said vector parameter of each of said plurality of pulse data objects having a directional parameter of longitudinal, and
  (xi) determining a direction of a source of the gamma radiation, relative to the radiation sensor, based on one or more outputted vector parameters,
wherein each of said plurality of apparatuses is located in a geographical location different from any other of said plurality of apparatuses.

16. The system of claim 15, wherein said method further comprises the step of comparing said vector parameters of said plurality of pulse data objects, obtained from geographically dispersed gamma radiation detectors using a triangulation method.

17. The system of claim 16, wherein said triangulation method comprises the steps of:
standardizing a first vector parameter $VP_1$ by subtracting 90 degrees if first vector parameter $VP_1$ is greater than or equal to 90 degrees and less than 180 degrees, subtracting 180 degrees if first vector parameter $VP_1$ is greater than or equal to 180 degrees and less than 270 degrees, and subtracting 270 degrees if first vector parameter $VP_1$ is greater than or equal to 270 degrees and less than 360 degrees;
standardizing a second vector parameter $VP_2$ by subtracting 90 degrees if second vector parameter $VP_2$ is greater than 90 degrees and less than or equal to 180 degrees, subtracting 180 degrees if second vector parameter $VP_2$ is greater than 180 degrees and less than or equal to 270 degrees, and subtracting 270 degrees if second vector parameter $VP_2$ is greater than 270 degrees and less than or equal to 360 degrees;
calculating a length L between a first position parameter $PP_1$ and a second position parameter $PP_2$ using the equation:

$$L=\sqrt{(PP_{1x}-PP_{2x})^2+(PP_{2y}-PP_{1y})^2};$$

where $PP_{1x}$ is the x coordinate of said first position parameter $PP_1$, $PP_{2x}$ is the x coordinate of said second position parameter $PP_2$, $PP_{1y}$ is the y coordinate of said first position parameter $PP_1$, and $PP_2$, is the y coordinate of said second position parameter $PP_2$;
calculating a distance D between a gamma radiation source and said second position parameter $PP_2$ using the equation:

$$D = \frac{L*\sin(VP_1)}{\sin(180-VP_1-VP_2)};$$

calculating an x coordinate $GP_x$ of said gamma radiation source using the equation:

$$GPx=PP_{2x}+(D*\cos(VP_2));$$

calculating a y coordinate $GP_y$ of said gamma radiation source using the equation:

$$GPy=PP_{2y}+(D*\sin(VP_2)); \text{ and}$$

outputting said x coordinate $GP_x$ and said y coordinate $GP_y$ of said gamma radiation source.

* * * * *